US012750321B2

(12) United States Patent
Guo et al.

(10) Patent No.: US 12,750,321 B2
(45) Date of Patent: Sep. 29, 2026

(54) PACKET TRANSMISSION METHOD AND NETWORK DEVICE

(71) Applicant: NEW H3C TECHNOLOGIES CO., LTD., Zhejiang (CN)

(72) Inventors: Daorong Guo, Beijing (CN); Guangliang Wen, Beijing (CN); Zhen Cheng, Beijing (CN); Hui Lin, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 325 days.

(21) Appl. No.: 18/570,269

(22) PCT Filed: Dec. 29, 2021

(86) PCT No.: PCT/CN2021/142637

§ 371 (c)(1),
(2) Date: Dec. 14, 2023

(87) PCT Pub. No.: WO2023/123104

PCT Pub. Date: Jul. 6, 2023

(65) Prior Publication Data

US 2024/0323136 A1 Sep. 26, 2024

(51) Int. Cl.
*H04L 47/50* (2022.01)
*H04L 47/24* (2022.01)

(52) U.S. Cl.
CPC .............. *H04L 47/50* (2013.01); *H04L 47/24* (2013.01)

(58) Field of Classification Search
CPC ................................ H04L 47/24; H04L 47/50
(Continued)

(56) References Cited

U.S. PATENT DOCUMENTS 8,130,650 B2 * 3/2012 Allen, Jr. ................ H04L 47/32 370/414
8,554,860 B1 * 10/2013 Cook ...................... H04L 47/12 709/207

(Continued)

FOREIGN PATENT DOCUMENTS

CN 108040019 A 5/2018
CN 109783250 A 5/2019

(Continued)

OTHER PUBLICATIONS

Japanese Patent Office, Office Action Issued in Application No. 2023-572986, Oct. 29, 2024, 11 pages.

(Continued)

*Primary Examiner* — Peter G Solinsky
(74) *Attorney, Agent, or Firm* — Greenblum & Bernstein, P.L.C.

(57) ABSTRACT

A packet transmission method includes: after an output forwarding and processing unit obtains a packet, if the packet belongs to a deterministic flow, storing the packet into a deterministic flow input queue; for each packet in the deterministic flow input queue, determining encapsulation information corresponding to the packet, wherein the encapsulation information at least includes cyclic queue (CQ) queue information; encapsulating the packet based on the encapsulation information, and storing the packet into a deterministic flow output queue; obtaining, by an output interface unit, a packet from the deterministic flow output queue and based on the CQ queue information corresponding to the packet, storing the packet into a CQ queue corresponding to the CQ queue information; determining, by the output interface unit, a target CQ queue corresponding to a current scheduling cycle, and sending a packet in the target (Continued)

CQ queue to an external device within the current scheduling cycle.

13 Claims, 6 Drawing Sheets

(58) Field of Classification Search
USPC .......................................................... 370/412
See application file for complete search history.

(56) References Cited

U.S. PATENT DOCUMENTS

| | | | | |
|---|---|---|---|---|
| 9,985,861 | B2 * | 5/2018 | Sinha | H04L 43/04 |
| 2020/0044931 | A1 | 2/2020 | Boon | |
| 2021/0014177 | A1 * | 1/2021 | Kasichainula | H04L 49/901 |
| 2021/0058334 | A1 | 2/2021 | Greth et al. | |
| 2022/0094434 | A1 * | 3/2022 | Subbareddy | H04L 67/1097 |
| 2024/0345988 | A1 * | 10/2024 | Lyu | H04L 69/22 |

FOREIGN PATENT DOCUMENTS

| | | | | |
|---|---|---|---|---|
| CN | 112585914 | A | 3/2021 | |
| CN | 112737979 | A | 4/2021 | |
| CN | 112995064 | A | 6/2021 | |
| CN | 113316191 | A | 8/2021 | |
| CN | 113366805 | A | 9/2021 | |
| CN | 113382442 | A | 9/2021 | |
| CN | 113708903 | A | 11/2021 | |
| CN | 113711572 | A | 11/2021 | |
| EP | 2302847 | A1 * | 3/2011 | H04L 49/90 |
| JP | 2006157323 | A | 6/2006 | |
| JP | 2007512783 | A | 5/2007 | |
| WO | WO-2021014180 | A1 * | 1/2021 | H04L 41/5025 |
| WO | 2021180073 | A1 | 9/2021 | |

OTHER PUBLICATIONS

State Intellectual Property Office of the People's Republic of China, Office Action and Search Report Issued in Application No. 2021800043325, Jul. 30, 2025, 15 pages.
European Patent Office, Extended European Search Report Issued in Application No. 21969472.6, Jul. 10, 2024, Germany, 11 pages.
Cao Zhipeng et al: "Enhanced System Design and Scheduling Strategy for Switches in Time-Sensitive Networking", XP011845843, IEEE Access, IEEE, USA, vol. 9 , Feb. 24, 2021, 14 pages.
ISA State Intellectual Property Office of the People's Republic of China, Written Opinion of the International Searching Authority Issued in Application No. PCT/CN2021/142637, Sep. 6, 2022, WIPO, 7 pages.
ISA State Intellectual Property Office of the People's Republic of China, International Search Report Issued in Application No. PCT/CN2021/142637, Sep. 6, 2022, WIPO, 2 pages.
Chen et al."Segment Routing (SR) Based Bounded Latency", 2019,https://tools.ietf.org/html/draft-chen-detnet-sr-based-bounded-latency-01, Nov. 8, 2019, 24 pages.

* cited by examiner

PACKET TRANSMISSION METHOD AND NETWORK DEVICE

CROSS REFERENCE TO RELATED APPLICATIONS

This application is a National Stage of International Application No. PCT/CN2021/142637, filed on Dec. 29, 2021, the disclosure of which is incorporated herein by reference in its entirety for all purposes.

TECHNICAL FIELD

The present disclosure relates to the field of communication technologies, and in particular to a packet transmission method and a network device.

BACKGROUND

Deterministic Network (DetNet) may provide deterministic service functions for bearer services in a network domain, and these deterministic service functions may include delay, and packet loss rate and the like. Time Sensitive Network (TSN) may be a deterministic network achieved based on a local area network. In the TSN, deterministic transmission of a forwarding layer can be guaranteed using Cyclic Queuing and Forwarding (CQF) so as to provide deterministic service functions for the bearer services.

For ease of description, service flows having deterministic service functions (e.g. delay and packet loss rate and the like) transmitted in a deterministic network are referred to as deterministic flows. Other service flows different from the deterministic flows can be forwarded in a best effort way. Thus, other service flows different from the deterministic flows referred to as best-effort flows.

SUMMARY

The present disclosure provides a packet transmission method which is applied to a network device. The network device at least includes an output forwarding and processing unit and an output interface unit. The method includes:

- after the output forwarding and processing unit obtains a packet, if the packet belongs to a deterministic flow, storing the packet into a deterministic flow input queue; for each packet in the deterministic flow input queue, determining encapsulation information corresponding to the packet, wherein the encapsulation information at least comprises cyclic queue (CQ) queue information; encapsulating the packet based on the encapsulation information, and storing the encapsulated packet into a deterministic flow output queue;
- obtaining, by the output interface unit, the packet from the deterministic flow output queue and based on the CQ queue information corresponding to the packet, storing the packet into a CQ queue corresponding to the CQ queue information;
- determining, by the output interface unit, a target CQ queue corresponding to a current scheduling cycle, and sending a packet in the target CQ queue to an external device within the current scheduling cycle.

The present disclosure provides a network device including an output forwarding and processing unit and an output interface unit.

The output forwarding and processing unit is configured to, after obtaining a packet, if the packet belongs to a deterministic flow, store the packet into a deterministic flow input queue; for each packet in the deterministic flow input queue, determine encapsulation information corresponding to the packet, wherein the encapsulation information at least includes cyclic queue (CQ) queue information; and perform encapsulation for the packet based on the encapsulation information and store the encapsulated packet into a deterministic flow output queue.

The output interface unit is configured to obtain the packet from the deterministic flow output queue, and based on the CQ queue information corresponding to the packet, store the packet into a CQ queue corresponding to the CQ queue information.

The output interface unit is configured to determine a target CQ queue corresponding to a current scheduling cycle and send a packet in the target CQ queue to an external device within the current scheduling cycle.

As can be seen from the above technical solution, in the embodiments of the present disclosure, it can be guaranteed that the forwarding of the deterministic flow is not affected by the forwarding of the best-effort flow and the best-effort flow forwarding and the deterministic flow forwarding are mutually compatible. Based on Cycle Specified Queuing and Forwarding (CSQF), packet transmission of wide area deterministic network and co-existence of the deterministic flow and the best-effort flow can be achieved so as to facilitate full integration of full services of common networks and common paths. When the deterministic flow reserved bandwidth is not used by the deterministic flow, it can be used by the best-effort flow, and the deterministic flow will not be affected in a case of occurrence of congestion. Thus, the congestion situations can be solved by controlling the number of best-effort flows. Hierarchical Quality of Service (HQOS) scheduling for the best-effort flow is maintained but the HQOS scheduling is not performed for the deterministic flow.

BRIEF DESCRIPTION OF THE DRAWINGS

In order to make the technical solutions of the embodiments of the present disclosure or in the prior art clearer, the accompanying drawing involved in the descriptions of the embodiments or the prior art will be briefly introduced below. Obviously, the following drawings only show some embodiments of the present disclosure and those skilled in the art may obtain other relevant drawings based on these drawings of the embodiments of the present disclosure.

DETAILED DESCRIPTION OF THE EMBODIMENTS

Figure 1:
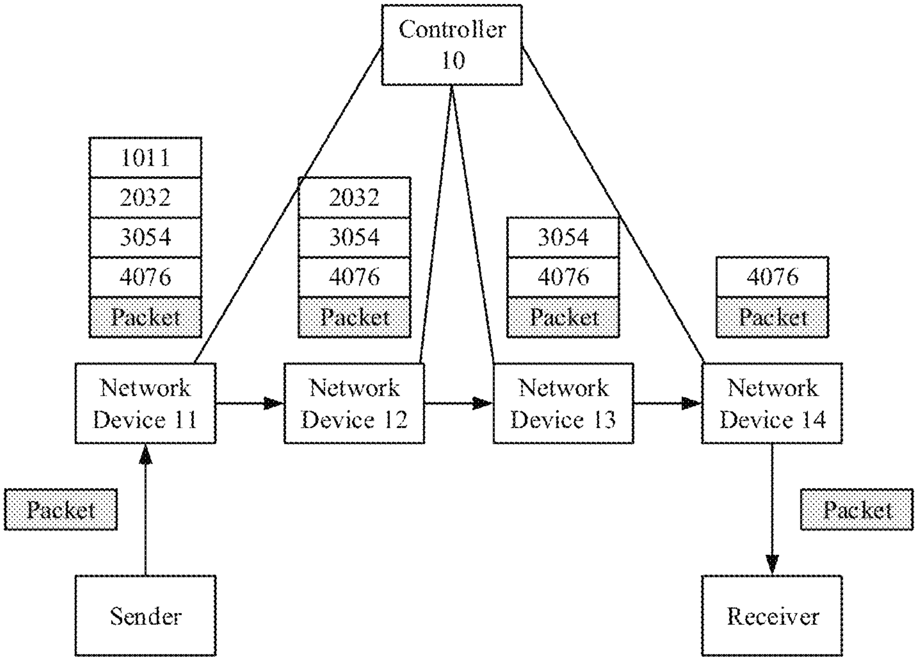
FIG. 1 is a schematic diagram illustrating a working principle of CSQF according to an embodiment of the present disclosure.

The term used in the embodiments of present disclosure is for the purpose of describing a particular example only, and is not intended to be limiting of the present disclosure. The singular forms such as "a", 'said", and "the" used in the present disclosure and the appended claims are also intended to include plural forms, unless the context clearly indicates otherwise. It is also to be understood that the term "and/or" as used herein refers to and includes any or all possible combinations of one or more associated listed items.

It is to be understood that although various information may be described using the terms such as first, second, third, etc. in the present disclosure, these information should not be limited to these terms. These terms are used only to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "determining in response to".

A Time Sensitive Network (TSN) is a deterministic network achieved based on a local area network. In the TSN, deterministic transmission of a forwarding layer can be guaranteed using Cyclic Queuing and Forwarding (CQF) so as to provide deterministic service functions for the bearer services. Of course, the CQF is only an example of providing deterministic services and another way can also be used to guarantee the deterministic transmission of the forwarding layer and therefore no limitation is made hereto. CQF is a technology close to the CSQF. In the present embodiment, CQF is taken as an example. The basic working principle of the CQF is as follows: an egress interface of each network device is associated with two queues, and a temporal domain is divided into two cycles; and the two queues alternately performs sending and reception in the two cycles. For example, the two queues are denoted as a queue Q1 and a queue Q2 respectively and the two cycles are denoted as a cycle T0 and a cycle T1. In the cycle of T0, the queue Q1 performs sending and the queue Q2 performs reception (the reception of the queue Q1 is off and the reception of the queue Q2 is on; the sending of the queue Q1 is on and the sending of the queue Q2 is off); in the cycle of T1, the queue Q1 performs reception and the queue Q2 performs sending, and so on. In this way, the queue Q1 and the queue Q2 can alternatively perform the sending or reception in the odd and even cycles.

The CQF requires transmission of one cycle for each hop. A packet is received within a cycle of a network device and sent out in a next cycle, whereas a next-hop network device receives the packet in the next cycle and so on. In this way, when the cycle T is a determined value, a transmission delay (end-to-end transmission delay) of the packet on a path is determined. A minimum value of the transmission delay is (H−1)*T and a maximum value of the transmission delay is (H+1)*T, where H is a number of hops representing a total number of network devices passed through on the path.

CQF is a technology based on local area network and cannot be achieved in wide area network. In order to achieve deterministic transmission of wide area network, Cycle Specified Queuing and Forwarding (CSQF) is proposed based on CQF to combine with Segment Routing (SR) application or SRv6 application to realize the deterministic transmission in wide area network. SR may be based on Multi-Protocol Label Switching (MPLS), and SRv6 may be based on IPV6.

FIG. 1 is a schematic diagram illustrating a working principle of CSQF. A controller 10 is used to collect information of various network devices, such as sending capability, interface, number of cycles and in-node maximum jitter. For the needs of deterministic transmission between a sender and a receiver, the controller 10, if finding there is sufficient transmission resources based on calculation, allocates a transmission path and distributes information of the transmission path to an edge node. As shown in FIG. 1, the transmission path between the sender and the receiver may be as follows: network device 11-network device 12-network device 13-network device 14, where the edge node in this transmission path (i.e. the first network device) is the network device 11.

After receiving a packet to be forwarded, the network device 11 adds information of each network device in the transmission path to the packet, such as a node identifier (for example, Locator in Segment identifier (SID) of SRv6) of each network device in the transmission path, a sending interface of each network device, and a sending cycle of each network device. In this case, when a packet reaches one of the network devices, the network device may obtain corresponding interface and cycle information and then store the packet into a queue corresponding to the cycle.

Each network device can send the packets in each queue cyclically based on a certain cycle, that is, each queue corresponds to one cycle and the packets in the queue can be sent in this cycle. Since the periodic cycling of the network device is performed in a fixed pattern, in the network device 11, the specified cycle of each packet of the sender is fixed and the cycle in which each network device forwards a packet from the sender to the receiver is fixed. Therefore, the entire delay of the packet is also determined, thereby achieving deterministic transmission.

To sum up, the CSQF and the CQF can be implemented in a similar way with their differences below: CSQF needs at least three queues (such as 3, 6, 8, 9, 10, 12 and 15 queues, and 15 queues are taken as an example below). In each cycle, only one queue is in sending state and other queues are all in receiving state. CQF requires the cycle of each network device to be in strict synchronization, including phase synchronization, whereas the CSQF only requires the cycles to be synchronized in frequency without phase synchronization. Further, for a case where a transmission delay of a certain hop cannot be within one cycle, a queue for transmission of a next cycle may be specified so as to adapt to transmission delay of different network devices of wide area network.

Figure 2:
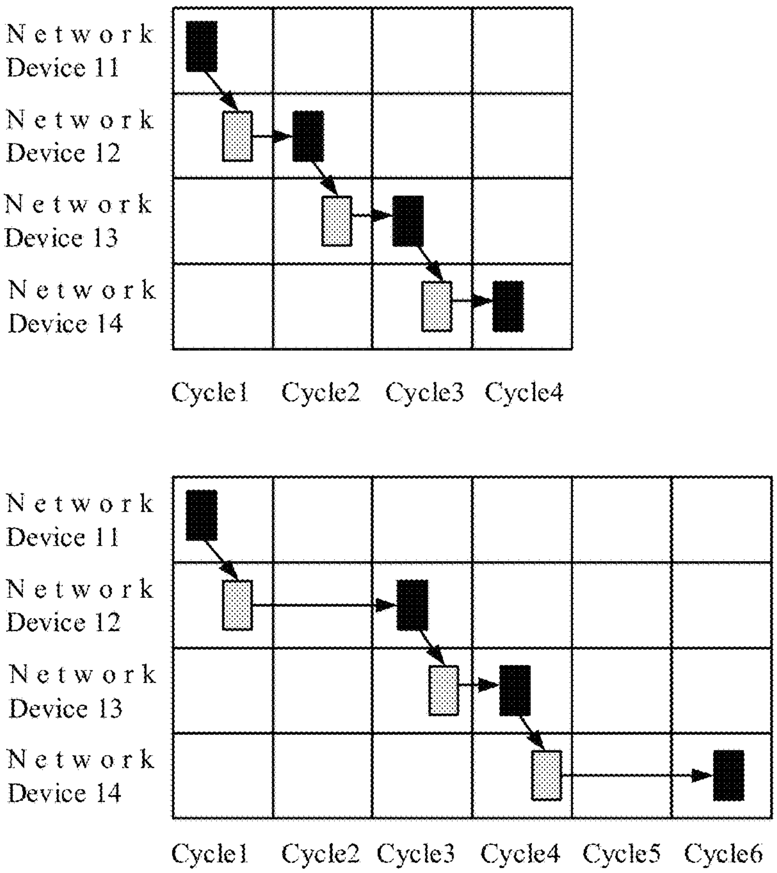
FIG. 2 is a schematic diagram illustrating a comparison of CSQF and CQF according to an embodiment of the present disclosure.

FIG. 2 is schematic diagram illustrating a comparison of CSQF and CQF. As far as the CQF is concerned, for a transmission process of a packet, the network device 11 sends the packet in cycle 1, the network device 12 receives the packet in cycle 1 and sends the packet in cycle 2, the network device 13 receives the packet in cycle 2 and sends the packet in cycle 3, and the network device 14 receives the packet in cycle 3 and sends the packet in cycle 4. For the CSQF, the CSQF may require, for example, three queues. In this case, for a transmission process of a packet, the network device 11 sends the packet in cycle 1, the network device 12 receives the packet in cycle 1 or cycle 2 and sends the packet in cycle 3, the network device 13 receives the packet in cycle 3 and sends the packet in cycle 4, and the network device 14 receives the packet in cycle 4 or cycle 5 and sends the packet in cycle 6.

In the implementation process of the CSQF, the entire delay of the packet can be determined because of the following reasons: each network device determines time slices with a fixed length as a cycle and performs unified flow scheduling for the deterministic service flows to enable the service flows to be forwarded in the determined time slices. The sending time of each network device in the transmission path is limited to be within a specific time slice such that the delay jitter of the packet in the network device is deterministic. Regardless of the number of network devices being increased, jitter of a previous network device will not increase the delay jitter of a next network device. When a total number of the network devices increases, the total delay of the packet forwarding can also be increased.

For the last network device, the packet can only be received and sent in a determined time slice, that is, the jitter range of the packet in the last network device is limited to be within one determined time slice.

Figure 3:
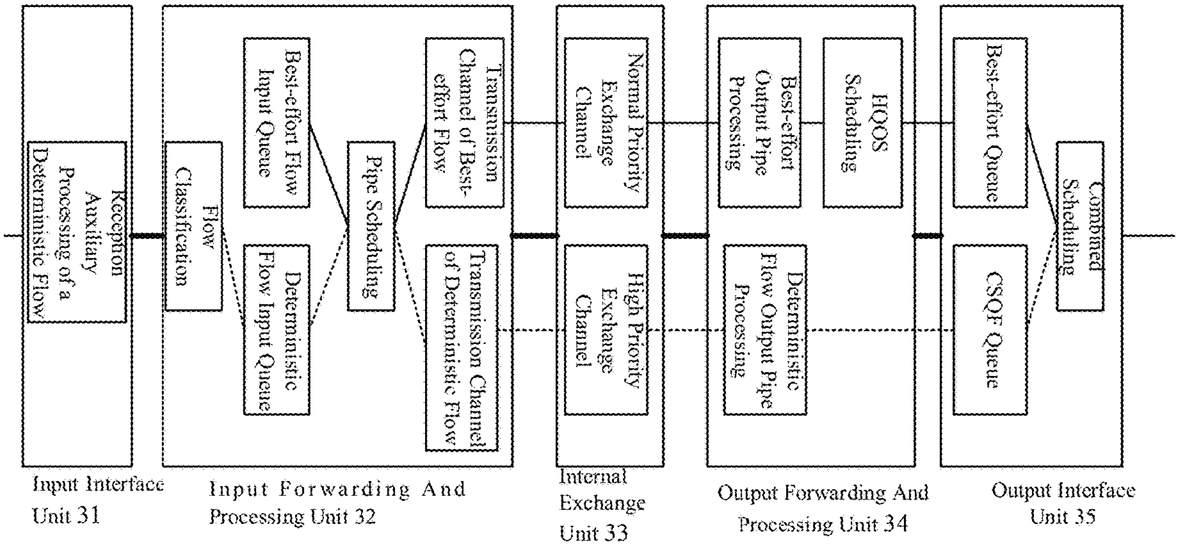
FIG. 3 is a structural schematic diagram illustrating a network device according to an embodiment of the present disclosure.

Although the CSQF can achieve deterministic transmission of wide area network and provide deterministic service functions for the bearer services, no reasonable solution on how each network device should implement CSQF in the prior art has been proposed. For the above problem, an embodiment of the present disclosure provides a CSQF-based implemented method of deterministic network transmission of wide area network, which may be applied to a network device, and the network device is also referred to as a network node or a forwarding node. FIG. 3 is a structural schematic diagram of a network device. The network device may include an input interface unit 31, an input forwarding and processing unit 32, an internal exchange unit 33, an output forwarding and processing unit 34 and an output interface unit 35.

The input interface unit 31 can achieve reception auxiliary processing of a deterministic flow, and the functions of the input interface unit 31 may include but are not limited to: identifying the deterministic flow; assisting the input forwarding and processing unit 32 to achieve flow classification such that the deterministic flow enters a deterministic flow input queue; timestamp function; and flow scheduling function.

The functions of the input forwarding and processing unit 32 include but are not limited to: achieving flow classification function, that is, distinguishing between packets belonging to deterministic flows and packets belonging to best-effort flows; for a packet belonging to the deterministic flow, storing the packet into the deterministic flow input queue, and for a packet belonging to the best-effort flow, storing the packet into a best-effort flow input queue; achieving priority scheduling function, that is, preferentially processing the packets in the deterministic flow input queue and then processing the packets in the best-effort flow input queue after the packets in the deterministic flow input queue are processed; achieving input channel processing function of the deterministic flow, that is, separating the transmission channel of the deterministic flow from the transmission channel of the best-effort flow such that the packets of the deterministic flow are sent through the transmission channel of the deterministic flow and the packets of the best-effort flow are sent through the transmission channel of the best-effort flow. By separating the transmission channel of the deterministic flow from the transmission channel of the best-effort flow, the transmission channel of the best-effort flow is allowed to be back-pressed (i.e. speed limiting processing) and the transmission channel of the deterministic flow is not allowed to be back-pressed.

The internal exchange unit 33 functions to ensure a high priority channel of the deterministic flow, that is, the internal exchange unit 33 preferentially sends the packets of the deterministic flow to the output forwarding and processing unit 34 and then sends the packets of the best-effort flow to the output forwarding and processing unit 34 after the packets of the deterministic flow are sent.

For example, the internal exchange unit 33 may include a high priority exchange channel and a normal priority exchange channel. The internal exchange unit 33 may send the packets of the deterministic flow through the high priority exchange channel and send the packets of the best-effort flow through the normal priority exchange channel.

The functions of the output forwarding and processing unit 34 may include but are not limited to: achieving best-effort output pipe processing function, that is, processing the packets of the best-effort flow; performing HQOS scheduling for the best-effort flow, that is, performing HQOS scheduling for the packets of the best-effort flow but not performing HQOS scheduling for the packets of the deterministic flow; achieving speed limitation function of the best-effort flow, that is, performing speed limitation processing for the packets of the best-effort flow but not performing speed limitation processing for the packets of the deterministic flow; and achieving deterministic flow output pipe processing function, that is, processing the packets of the deterministic flow.

The functions of the output interface unit 35 may include but are not limited to: achieving best-effort queue, and storing the packets of the best-effort flow by the best-effort queue; achieving back pressure function of the best-effort queue, for example, when the number of the packets in the best-effort queue reaches a number threshold, controlling the output forwarding and processing unit 34 to no longer store the packets of the best-effort flow into the best-effort queue; achieving CSQF queue of the deterministic flow and storing the packets of the deterministic flow by the CSQF queue; achieving combined scheduling of the deterministic flow and the best-effort flow, that is, scheduling the packets of the deterministic flow and the packets of the best-effort flow, for example, firstly sending the packets of the deterministic flow and then sending the packets of the best-effort flow.

Illustratively, the CSQF queue may include a Sending Queue (SQ), a Receiving Queue (RQ), and a Tolerating Queue (TQ). The SQ is a queue being sent in CSQF, the RQ is a queue being received in the CSQF. Those received packets which cannot normally enter the RQ queue due to jitter or the like will enter the TQ queue. In this embodiment, the SQ, RQ and TQ are collectively called Cyclic Queuing (CQ) queue. To sum up, the output interface unit 35 can achieve a CQ queue of the deterministic flow and store the packets of the deterministic flow by the CQ queue.

Figure 4A:
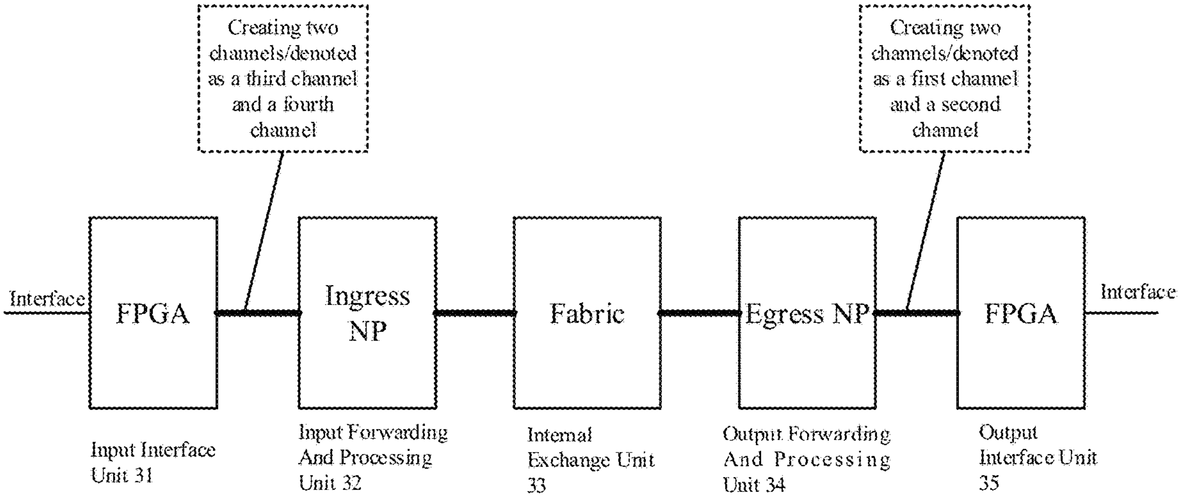
FIGS. 4A and 4B are structural schematic diagrams illustrating a network device according to an embodiment of the present disclosure.

In a possible implementation, as shown in FIG. 4A, the input interface unit 31 can be implemented by Field Programmable Gate Array (FPGA) and the input forwarding and processing unit 32 can be implemented by Network Processor (NP). For ease of distinguishing, the NP is referred to as ingress NP. The internal exchange unit 33 can be implemented by an exchange fabric and the output forwarding and processing unit 34 can be implemented by NP. For ease of distinguishing, the NP is referred to as Egress NP. The output interface unit 35 can be implemented by FPGA.

Two channels are created between the input interface unit 31 and the input forwarding and processing unit 32, that is, two channels are created in a physical interface between the input interface unit 31 and the input forwarding and processing unit 32. For ease of distinguishing, the two channels are denoted as a third channel and a fourth channel respectively. For example, if the physical interface between the input interface unit 31 and the input forwarding and processing unit 32 is Interlaken physical interface, the third channel and the fourth channel are created in a same Interlaken physical interface. The third channel is used to transmit packets belonging to the deterministic flow and the fourth channel is used to transmit packets belonging to the best-effort flow.

Two channels are created between the output forwarding and processing unit 34 and the output interface unit 35, i.e. two channels are created in a physical interface between the output forwarding and processing unit 34 and the output interface unit 35. For ease of distinguishing, the two channels are denoted as a first channel and a second channel respectively. For example, if the physical interface between the output forwarding and processing unit 34 and the output interface unit 35 is Interlaken physical interface, the first channel and the second channel are created in a same Interlaken physical interface. The first channel is used to transmit packets belonging to the deterministic flow and the second channel is used to transmit packets belonging to the best-effort flow.

Figure 4B:
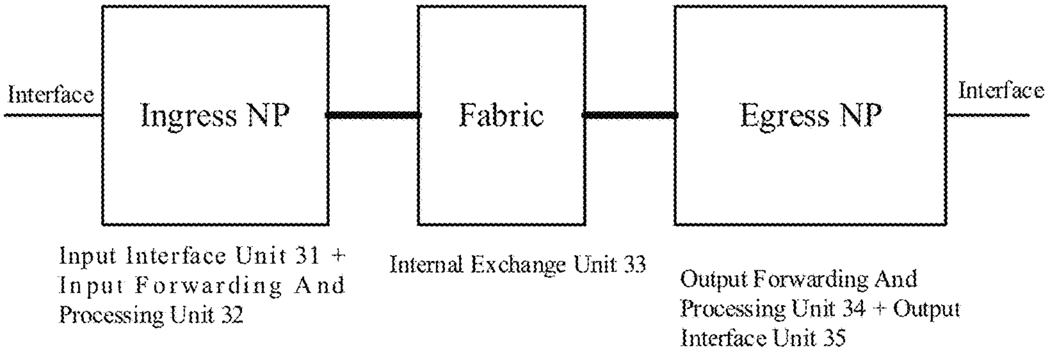

In another possible implementation, as shown in FIG. 4B, the input interface unit 31 and the input forwarding and processing unit 32 may be implemented by a same device, for example, simultaneously implemented by Ingress NP. The internal exchange unit 33 may be implemented by a switch fabric. The output forwarding and processing unit 34 and the output interface unit 35 may be implemented by a same device, for example, simultaneously implemented by Egress NP.

Of course, FIGS. 4A and 4B are only two examples, and the implementations of the input interface unit 31, the input forwarding and processing unit 32, the internal exchange unit 33, the output forwarding and processing unit 34 and the output interface unit 35 are not limited as long as the functions of these units can be achieved. Subsequent descriptions will be made with FIG. 4A as an example.

In combination with specific embodiments, the functions of the input interface unit 31, the input forwarding and processing unit 32, the internal exchange unit 33, the output forwarding and processing unit 34 and the output interface unit 35 are describe below.

Firstly, the input interface unit 31. After receiving a packet from the external device, the input interface unit 31 determines whether the packet belongs to the deterministic flow or the best-effort flow. If the packet belongs to the deterministic flow, the packet is stored into the deterministic flow output queue; if the packet belongs to the best-effort flow, the packet is stored into the best-effort flow output queue. On this basis, the input interface unit 31 sends the packets in the deterministic flow output queue to the input forwarding and processing unit 32 through the third channel and sends the packets in the best-effort flow output queue to the input forwarding and processing unit 32 through the fourth channel.

Illustratively, after receiving a packet from the external device, the input interface unit 31 analyzes out a flow feature from the packet. If the flow feature is matched with a deterministic flow feature in a configured ACL, it is determined that the packet belongs to the deterministic flow. If the flow feature is not matched with the deterministic flow feature in the ACL, it is determined that the packet belongs to the best-effort flow. The ACL may include at least one deterministic flow feature.

Illustratively, the input interface unit 31 may preferentially obtain a packet from the deterministic flow output queue and send the obtained packet to the input forwarding and processing unit 32 through the third channel. After all packets in the deterministic flow output queue are obtained, the input interface unit 31 obtains a packet from the best-effort flow output queue and sends the obtained packet to the input forwarding and processing unit 32 through the fourth channel.

Figure 5A:
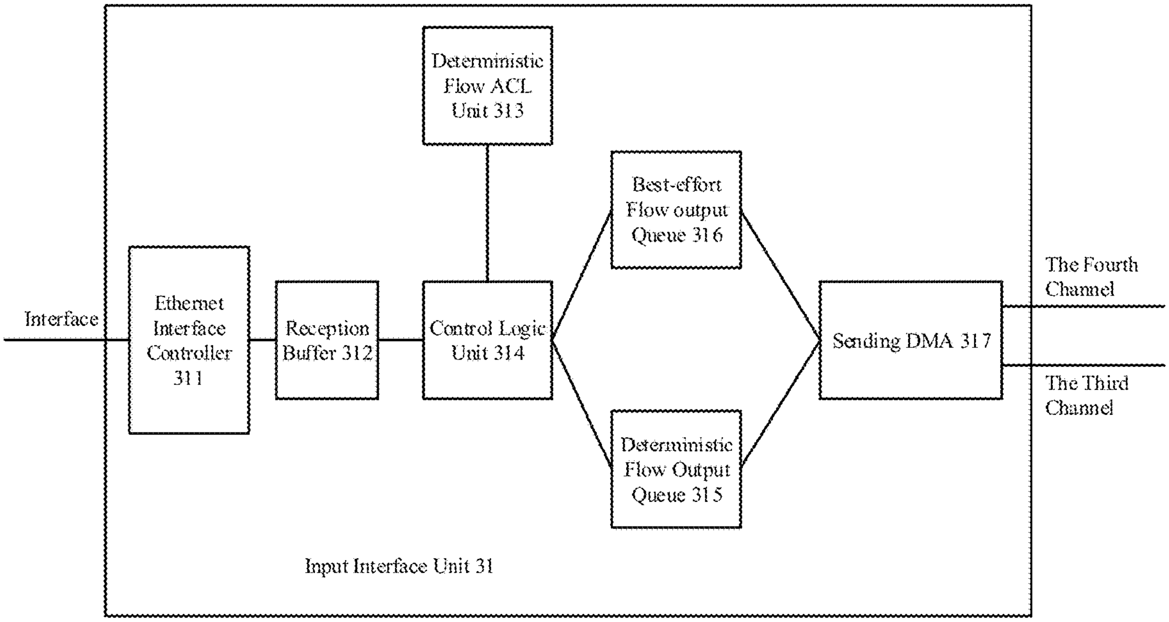
FIG. 5A is a structural schematic diagram illustrating an input interface unit according to an embodiment of the present disclosure.

FIG. 5A is a structural schematic diagram of the input interface unit 31. The input interface unit 31 may include an Ethernet interface controller 311, a reception buffer 312, a deterministic flow access control list (ACL) unit 313, a control logic unit 314, a deterministic flow output queue 315, a best-effort flow output queue 316 and a sending Direct Memory Access (DMA) 317.

The Ethernet interface controller 311 receives a packet from the external device through an Ethernet interface and sends the packet to the reception buffer 312 which performs reception buffering for the packet.

The deterministic flow ACL unit 313 is configured to obtain an ACL for the deterministic flow, for example, an upper-layer application may send an ACL for the deterministic flow to the deterministic flow ACL unit 313. The ACL may include at least one deterministic flow feature and can be used to identify the deterministic flow.

For example, the deterministic flow feature may be a destination Internet Protocol (IP) address indicating the packet corresponding to the destination IP address belongs to the deterministic flow. For another example, the deterministic flow feature may be a destination IP network segment indicating the packet corresponding to the destination IP network segment belongs to the deterministic flow. Of course, the above are only two examples of the deterministic flow feature and the deterministic flow feature is not limited as long as the deterministic flow can be determined based on the deterministic flow feature.

The deterministic flow ACL unit 313, after obtaining the ACL for the deterministic flow, may also store the ACL such that the control logic unit 314 can query the ACL in the deterministic flow ACL unit 313.

The control logic unit 314 may obtain a packet from the reception buffer 312 and analyze out a flow feature (i.e. keyword required by ACL) from the packet. If the flow feature is matched with any one deterministic flow feature in the ACL, it is determined that the packet belongs to the deterministic flow; if the flow feature is matched with no deterministic flow features in the ACL, it is determined that the packet belongs to the best-effort flow.

For example, if the deterministic flow feature is a destination IP address, the control logic unit 314 may analyze out a destination IP address from the packet. If the destination IP address of the packet is same as a destination IP address in the ACL, it is determined that the packet belongs to the deterministic flow; and if the destination IP address of the packet is different from all destination IP addresses in the ACL, it is determined that the packet belongs to the best-effort flow.

If it is determined that the packet belongs to the deterministic flow, the control logic unit 314 may add auxiliary information such as timestamp to a header of the packet and store the packet into the deterministic flow output queue 315, where the timestamp is used to represent a time that the Ethernet interface controller 311 receives the packet from the external device. If it is determined that the packet belongs to the best-effort flow, the control logic unit 314 stores the packet into the best-effort flow output queue 316.

To sum up, every time a packet belonging to the deterministic flow is received, the packet may be stored into the deterministic flow output queue 315, that is, the deterministic flow output queue 315 may include a plurality of packets belonging to the deterministic flow.

Every time a packet belonging to the best-effort flow is received, the packet may be stored into the best-effort flow output queue 316, that is, the best-effort flow output queue 316 may include a plurality of packets belonging to the best-effort flow.

The sending DMA 317 may read a packet from the deterministic flow output queue 315 and send the packet in the deterministic flow output queue 315 to the input forwarding and processing unit 32 through the third channel.

The sending DMA 317 may read a packet from the best-effort flow output queue 316 and send the packet in the best-effort flow output queue 316 to the input forwarding and processing unit 32 through the fourth channel.

For example, the sending DMA 317 may preferentially read a packet from the deterministic flow output queue 315 and send the packet to the input forwarding and processing unit 32 through the third channel. After all packets in the deterministic flow output queue 315 are sent, the sending DMA 317 can read a packet from the best-effort flow output queue 316 and send the packet to the input forwarding and processing unit 32 through the fourth channel.

For another example, the sending DMA 317 may read some packets from the deterministic flow output queue 315 and send the packets to the input forwarding and processing unit 32 through the third channel. Next, the sending DMA 317 may read some packets from the best-effort flow output queue 316 and send the packets to the input forwarding and processing unit 32 through the fourth channel. Then, the sending DMA 317 may continue reading some packets from the deterministic flow output queue 315 and send the packets to the input forwarding and processing unit 32 through the third channel. The above is repeated until the packets in the deterministic flow output queue 315 and the best-effort flow output queue 316 are all sent.

Secondly, the input forwarding and processing unit 32. After the input forwarding and processing unit 32 obtains a packet, if the packet belongs to the deterministic flow, the packet is stored into the deterministic flow input queue; if the packet belongs to the best-effort flow, the packet is stored into the best-effort flow input queue. When the input forwarding and processing unit 32 obtains a packet from the third channel, it is determined that the packet belongs to the deterministic flow. When the input forwarding and processing unit 32 obtains a packet from the fourth channel, it is determined that the packet belongs to the best-effort flow.

Illustratively, a queue priority corresponding to the deterministic flow input queue is higher than a queue priority corresponding to the best-effort flow input queue, such that the input forwarding and processing unit 32 preferentially processes the packet in the deterministic flow input queue. When the input forwarding and processing unit 32 processes the packet in the deterministic flow input queue, if the packet includes CQ queue indication information, a CQ queue corresponding to the CQ queue indication information is determined, otherwise, a CQ queue corresponding to the packet is determined based on a timestamp corresponding to the packet. On this basis, CQ queue information corresponding to the CQ queue is added to the packet and the packet is sent to the internal exchange unit 33.

When determining the CQ queue corresponding to the packet based on the timestamp, the input forwarding and processing unit 32 may query for an egress interface based on forwarding information corresponding to the packet, and determine a plurality of CQ queues corresponding to the egress interface, where each of the CQ queues has a corresponding scheduling cycle; and based on the timestamp corresponding to the packet, the input forwarding and processing unit 32 may select a scheduling cycle corresponding to the timestamp from all scheduling cycles and determine a CQ queue corresponding to the scheduling cycle.

When the input forwarding and processing unit 32 sends a packet in the deterministic flow input queue to the internal exchange unit 33, a high priority mark is added to the packet and the packet with high priority is sent to the internal exchange unit 33. When the input forwarding and processing unit 32 sends a packet in the best-effort flow input queue to the internal exchange unit 33, a low priority mark is added to the packet, and the packet with low priority is sent to the internal exchange unit 33.

Figure 5B:
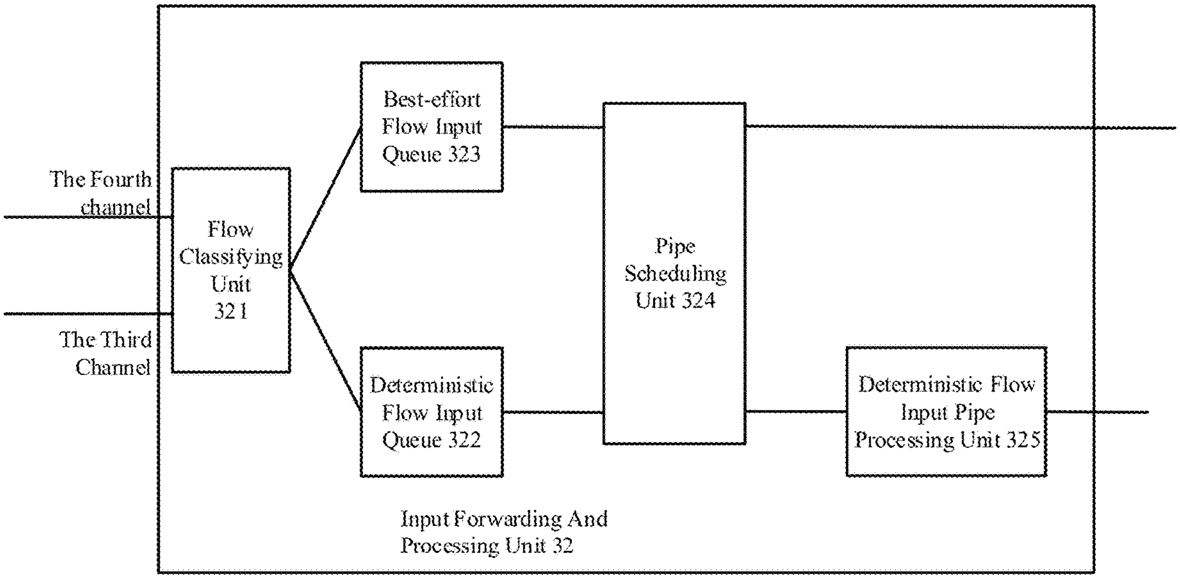
FIG. 5B is a structural schematic diagram illustrating an input forwarding processing unit according to an embodiment of the present disclosure.

FIG. 5B is a structural schematic diagram of the input forwarding and processing unit 32. The input forwarding and processing unit 32 may include a flow classifying unit 321, a deterministic flow input queue 322, a best-effort flow input queue 323, a pipe scheduling unit 324 and a deterministic flow input pipe processing unit 325.

When obtaining a packet from the third channel, the flow classifying unit 321 determines the packet belongs to the deterministic flow and stores the packet into the deterministic flow input queue 322. When obtaining a packet from the fourth channel, the flow classifying unit 321 determines the packet belongs to the best-effort flow and stores the packet into the best-effort flow input queue 323.

The input forwarding and processing unit 32 may support a plurality of physical queues and different physical queues may have different priorities. On this basis, a physical queue with high priority may be taken as the deterministic flow input queue 322 and a physical queue with low priority may be taken as the best-effort flow input queue 323. Obviously, since the deterministic flow input queue 322 uses a physical queue with high priority and the best-effort flow input queue 323 uses a physical queue with low priority. Thus, a queue priority corresponding to the deterministic flow input queue 322 may be higher than a queue priority corresponding to the best-effort flow input queue 323, thereby ensuring the packets in the deterministic flow input queue 322 are processed preferentially, that is, the packets belonging to the deterministic flow can be preferentially processed.

The pipe scheduling unit 324 may forward a packet in the deterministic flow input queue 322 and a packet in the best-effort flow input queue 323. When forwarding a packet, the pipe scheduling unit 324 may be a Processor Management Unit (PMU), that is, the PMU performs forwarding for the packet and the packet forwarding process is not limited herein.

Since the queue priority corresponding to the deterministic flow input queue 322 is higher than the queue priority corresponding to the best-effort flow input queue 323, the pipe scheduling unit 324 preferentially forwards the packets in the deterministic flow input queue 322, and then forward the packets in the best-effort flow input queue 323 after all packets in the deterministic flow input queue 322 are forwarded. When the pipe scheduling unit 324 performs forwarding for a packet, the packet may be allocated to a forwarding pipe (an allocation processor resource performs corresponding pipe processing) and the process of the pipe processing is not limited herein.

The deterministic flow input pipe processing unit 325 is configured to perform determinism-related forwarding processing, that is, on the basis of normal forwarding processing (forwarding processing performed by the pipe scheduling unit 324 is referred to as normal forwarding processing), the deterministic flow input pipe processing unit 325 performs determinism-related forwarding processing.

For example, for an edge node, such as the network device 11 shown in FIG. 1, when the deterministic flow input pipe processing unit 325 processes a packet in the deterministic flow input queue 322, if the packet does not include the CQ queue indication information (the CQ queue indication information needs to be added to the packet by the edge node), a timestamp (added to the packet by the input interface unit 31 to indicate a timestamp that the network device receives the packet) may be analyzed out from the packet and a CQ queue corresponding to the packet is determined based on the timestamp.

When the CQ queue corresponding to the packet is determined based on the timestamp, a forwarding entry (used to record a correspondence between forwarding information and egress interface) may be queried for based on forwarding information (e.g. destination IP address or the like) corresponding to the packet to obtain an egress interface corresponding to the forwarding information. Since each egress interface of the network device may correspond to a plurality of CQ queues, it indicates that the packets in these CQ queues can be forwarded through the egress interface. Therefore, after the egress interface corresponding to the forwarding information is obtained, a plurality of CQ queues corresponding to the egress interface can be determined.

For each CQ queue, the CQ queue may correspond to one scheduling cycle, which indicates that a packet in the CQ queue needs to be sent within the scheduling cycle. Further, based on a timestamp corresponding to the packet, a scheduling cycle corresponding to the timestamp may be selected from all scheduling cycles, that is, the timestamp is located in the selected scheduling cycle. Next, a CQ queue corresponding to the selected scheduling cycle is determined, and the CQ queue is the CQ queue corresponding to the packet. In subsequent process, it is required to add the packet to the CQ queue.

In order to determine a CQ queue corresponding to a scheduling cycle, a timeslot table may be obtained, where the timeslot table includes a mapping relationship between scheduling cycle and CQ queue. On this basis, after the scheduling cycle corresponding to the timestamp is obtained, the timeslot table is queried based on the scheduling cycle to obtain a CQ queue corresponding to the scheduling cycle.

To sum up, for the edge node, the deterministic flow input pipe processing unit 325 may obtain a CQ queue corresponding to the packet and add CQ queue information corresponding to the CQ queue, for example, a queue identifier, to the packet.

For the edge node, a CQ queue of the packet in each intermediate node (e.g. network device 12, network device 13, and network device 14 and the like) may also be determined and the determination process is not limited herein and can be referred to the working principle of CSQF. After the CQ queue of the packet in each intermediate node is obtained, CQ queue indication information may be added to the packet, where the CQ queue indication information includes CQ queue information corresponding to the packet in each intermediate node, for example, CQ queue information of the CQ queue corresponding to the packet in the network device 12, CQ queue information of the CQ queue corresponding to the packet in the network device 13 and CQ queue information of the CQ queue corresponding to the packet in the network device 14.

For example, for the intermediate nodes, such as the network device 12, the network device 13 and the network device 14 and the like shown in FIG. 1, when the deterministic flow input pipe processing unit 325 processes a packet in the deterministic flow input queue 322, the packet may include CQ queue indication information (the CQ queue indication information is added to the packet by the edge node, for example, the CQ queue indication information may be carried in the SID of SRv6, which is only an example). Therefore, the CQ queue indication information may be analyzed out from the packet and a CQ queue corresponding to the CQ queue indication information is determined. For example, for the network device 12, the CQ queue indication information may include CQ queue information of the CQ queue corresponding to the packet in the network device 12. As a result, a CQ queue corresponding to the CQ queue information can be directly determined, and the CQ queue is a CQ queue corresponding to the packet. In subsequent process, it is required to add the packet to the CQ queue.

To sum up, the deterministic flow input pipe processing unit 325 may obtain the CQ queue corresponding to the packet in each intermediate node and add the CQ queue information corresponding to the CQ queue, for example, queue identifier, to the packet.

As mentioned in the above embodiment, after the packet in the deterministic flow input queue 322 is processed by the pipe scheduling unit 324 and the deterministic flow input pipe processing unit 325, the packet may be sent to the internal exchange unit 33. When the packet is sent to the internal exchange unit 33, a high priority mark may be added to the packet and then the packet with high priority mark is sent to the internal exchange unit 33. After the packet in the best-effort flow input queue 323 is processed by the pipe scheduling unit 324, the packet may be sent to the internal exchange unit 33. When the packet is sent to the internal exchange unit 33, a low priority mark may be added to the packet and then the packet with low priority mark is sent to the internal exchange unit 33.

Thirdly, internal exchange unit 33. After receiving a packet with high priority mark (a packet belonging to the deterministic flow), the internal exchange unit 33 sends the packet to the output forwarding and processing unit 34 based on high priority mark; after receiving a packet with low priority mark (a packet belonging to the best-effort flow), the internal exchange unit 33 sends the packet to the output forwarding and processing unit 34 based on low priority mark.

For example, based on high priority mark and low priority mark, the internal exchange unit 33 preferentially sends packets with high priority mark to the output forwarding and processing unit 34, and then sends packets with low priority mark to the output forwarding and processing unit 34 after sending the packets with high priority mark.

Fourthly, the output forwarding and processing unit 34. After the output forwarding and processing unit 34 obtains a packet, if the packet belongs to the deterministic flow, the packet may be stored into the deterministic flow input queue; if the packet belongs to the best-effort flow, the packet may be stored into the best-effort flow input queue. For each packet in the deterministic flow input queue, the output forwarding and processing unit 34 may determine encapsulation information corresponding to the packet, where the encapsulation information at least includes CQ queue information; encapsulate the packet based on the encapsulation information and store the encapsulated packet to the deterministic flow output queue. For each packet in the best-effort flow input queue, the output forwarding and processing unit 34 may perform HQOS scheduling for the packet and store the HQOS-scheduled packet into the best-effort flow output queue. There is a first channel and a second channel between the output interface unit 35 and the output forwarding and processing unit 34. The output forwarding and processing unit 34 may send a packet in the deterministic flow output queue to the output interface unit 35 through the first channel, and send a packet in the best-effort flow output queue to the output interface unit 35 through the second channel.

Figure 5C:
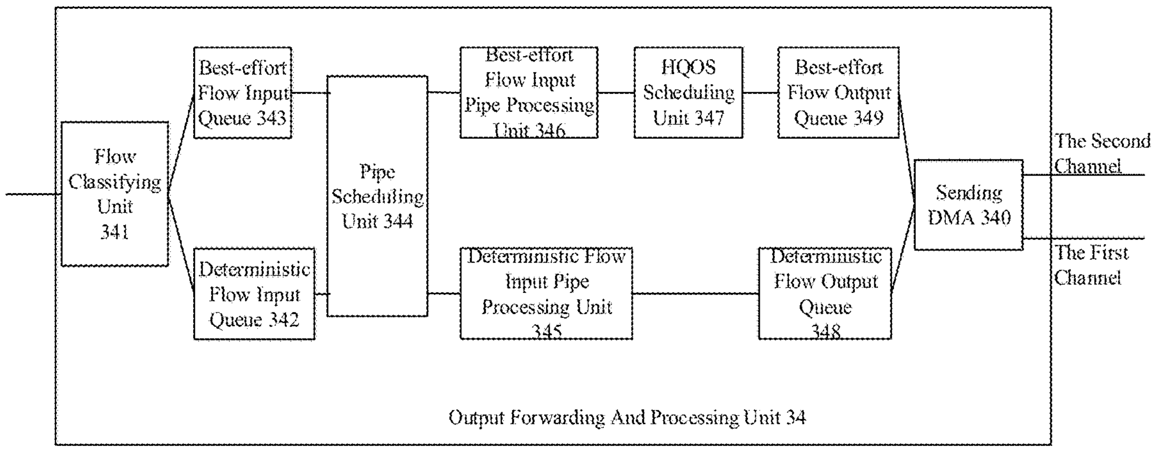
FIG. 5C is a structural schematic diagram illustrating an output forwarding and processing unit according to an embodiment of the present disclosure.

FIG. 5C is a structural schematic diagram of the output forwarding and processing unit 34. The output forwarding and processing unit 34 may include a flow classifying unit 341, a deterministic flow input queue 342, a best-effort flow input queue 343, a pipe scheduling unit 344, a deterministic flow input pipe processing unit 345, a best-effort flow input pipe processing unit 346, a HQOS scheduling unit 347, a deterministic flow output queue 348, a best-effort flow output queue 349, and a sending DMA 340.

The internal exchange unit 33 may include a high priority exchange channel and a normal priority exchange channel. The internal exchange unit 33 may send a packet of the deterministic flow through the high priority exchange channel and send a packet of the best-effort flow through the normal priority exchange channel. On this basis, when obtaining a packet through the high priority exchange channel, the flow classifying unit 341 determines the packet belongs to the deterministic flow and stores the packet into the deterministic flow input queue 342. When obtaining a packet through the normal priority exchange channel, the flow classifying unit 341 determines the packet belongs to the best-effort flow and stores the packet into the best-effort flow input queue 343.

The output forwarding and processing unit 34 may support a plurality of physical queues and different physical queues may have different priorities. On this basis, a physical queue with high priority may be taken as the deterministic flow input queue 342 and a physical queue with low priority may be taken as the best-effort flow input queue 343. Obviously, since the deterministic flow input queue 342 uses a physical queue with high priority and the best-effort flow input queue 343 uses a physical queue with low priority, a queue priority corresponding to the deterministic flow input queue 342 is higher than a queue priority corresponding to the best-effort flow input queue 343, thereby ensuring the packets in the deterministic flow input queue 342 are processed preferentially, that is, the packets belonging to the deterministic flow can be preferentially processed.

The pipe scheduling unit 344 forwards packets in the deterministic flow input queue 342 and packets in the best-effort flow input queue 343, where the forwarding processing is not limited herein. Since the queue priority corresponding to the deterministic flow input queue 342 is higher than the queue priority corresponding to the best-effort flow input queue 343, the pipe scheduling unit 344 preferentially forwards the packets in the deterministic flow input queue 342, and then forwards the packets in the best-effort flow input queue 343 after all packets in the deterministic flow input queue 342 are forwarded.

The deterministic flow input pipe processing unit 345 is configured to perform determinism-related forwarding processing, that is, on the basis of normal forwarding processing (forwarding processing performed by the pipe scheduling unit 344 is referred to as normal forwarding processing), the deterministic flow input pipe processing unit 345 performs determinism-related forwarding processing.

For example, for each packet in the deterministic flow input queue 342, the deterministic flow input pipe processing unit 345 may analyze out CQ queue information from the packet (added by the input forwarding and processing unit 32 to the packet) and determine the CQ queue information as encapsulation information corresponding to the packet. Of course, the above is only an example of the encapsulation information and the encapsulation information is not limited herein. For example, an MAC address of an egress interface of the present network device and an MAC address of a next-hop network device and the like can be obtained and the MAC address of the egress interface of the present network device and the MAC address of the next-hop network device may also be taken as encapsulation information.

After obtaining the encapsulation information, the deterministic flow input pipe processing unit 345 may encapsulate the packet based on the encapsulation information, for example, may encapsulate the CQ queue information etc. at the outer layer of the packet, and then store the encapsulated packet into the deterministic flow output queue 348. After performing encapsulation, the deterministic flow input pipe processing unit 345 may also bypass the HQOS scheduling unit 347 implemented for the best-effort flow, that is, it is no need to adopt the HQOS scheduling unit 347 to perform HQOS scheduling for the packet in the deterministic flow input queue 342. The packets in the deterministic flow input queue 342 will not be HQOS-scheduled and thus will not be affected by the best-effort scheduling, such that the packets in the deterministic flow input queue 342 can be forwarded quickly.

The best-effort flow input pipe processing unit 346 is configured to perform best-effort-related forwarding processing, that is, perform best-effort-related forwarding processing on the basis of normal forwarding processing. For example, for each packet in the best-effort flow input queue 343, the best-effort flow input pipe processing unit 346 determines encapsulation information corresponding to the packet, for example, the MAC address of the egress interface of the present network device and the MAC address of the next-hop network device and the like, and encapsulates the packet based on the encapsulation information, for example, encapsulates these encapsulation information at the outer layer of the packet and sends the encapsulated packet to the HQOS scheduling unit 347.

The HQOS scheduling unit 347 is configured to perform HQOS scheduling for each packet in the best-effort flow input queue 343 and the HQOS scheduling process is not limited herein. After completing the HQOS scheduling process for the packet, the HQOS scheduling unit 347 may store the packet into the best-effort flow output queue 349.

The sending DMA 340 may read a packet from the deterministic flow output queue 348 and send the packet in the deterministic flow output queue 348 to the output interface unit 35 through the first channel. The sending DMA 340 may read a packet from the best-effort flow output queue 349 and send the packet in the best-effort flow output queue 349 to the output interface unit 35 through the second channel. Since the packets in the deterministic flow output queue 348 and the best-effort flow output queue 349 are transmitted through different channels, when the output interface unit 35 is congested, only the transmission channel of the best-effort flow, i.e the second channel may be back-pressed without back-pressing the transmission channel of the deterministic flow, i.e. the first channel, so as to provide strong support for delay determinism.

For example, the sending DMA 340 may preferentially read a packet from the deterministic flow output queue 348 and send the packet to the output interface unit 35 through the first channel. After sending all packets in the deterministic flow output queue 348, the sending DMA 340 may read a packet from the best-effort flow output queue 349 and send the packet to the output interface unit 35 through the second channel.

For another example, the sending DMA 340 may read some packets from the deterministic flow output queue 348 and send the packets to the output interface unit 35 through the first channel. Next, the sending DMA 340 may read some packets from the best-effort flow output queue 349 and send the packets to the output interface unit 35 through the second channel. Then, the sending DMA 340 may continue reading some packets from the deterministic flow output queue 348 and send the packets to the output interface unit 35 through the first channel. The above is repeated until the packets in the deterministic flow output queue 348 and the best-effort flow output queue 349 are all sent.

Fifthly, the output interface unit 35. The output interface unit 35 may obtain a packet from the deterministic flow output queue 348 and based on CQ queue information corresponding to the packet, store the packet into a CQ queue corresponding to the CQ queue information. The output interface unit 35 may obtain a packet from the best-effort flow output queue 349 and store the packet into Best Effort Queue (BEQ).

For each scheduling cycle, a current ongoing scheduling cycle is referred to as a current scheduling cycle and the output interface unit 35 determines a target CQ queue corresponding to the current scheduling cycle and sends a packet in the target CQ queue to the external device in the current scheduling cycle. After the packets in the target CQ queue are all sent, if the current scheduling cycle still has a remaining time slice, the output interface unit 35 sends a packet in the BEQ queue to the external device in the remaining time slice of the current scheduling cycle. For example, when the output interface unit 35 determines a length of packets which may be sent within a remaining time slice, if the length is greater than a configured length (configured based on experience), the output interface unit 35 sends one packet in the BEQ queue to the external device within the remaining time slice of the current scheduling cycle; if the packet length is not greater than the configured length, the output interface unit 35 stops sending a packet in the BEQ queue to the external device within the remaining time slice of the current scheduling cycle. Illustratively, after one packet in the BEQ queue is sent to the external device, the remaining time slice of the current scheduling cycle may be updated, and based on the updated remaining time slice, the operation of determining a length of packets which may be sent within the remaining time slice is performed.

Illustratively, when the number of packets in the BEQ queue is greater than a first preset threshold, the output interface unit 35 may further output a flow control signal for the second channel; when the number of packets in the BEQ queue is less than a second preset threshold, the output interface unit 35 may cancel the flow control signal for the second channel. The second preset threshold is less than or equal to the first preset threshold, which is not limited herein. On this basis, when a flow control signal for the second channel is present, packet transmission of the second channel is paused, that is, the output forwarding and processing unit 34 will no longer transmit the packets in the best-effort flow output queue 349 to the output interface unit 35 through the second channel. When no flow control signal for the second channel is present, packet transmission of the second channel is continued, that is, the output forwarding and processing unit 34 transmits the packets in the best-effort flow output queue 349 to the output interface unit 35.

Figure 5D:
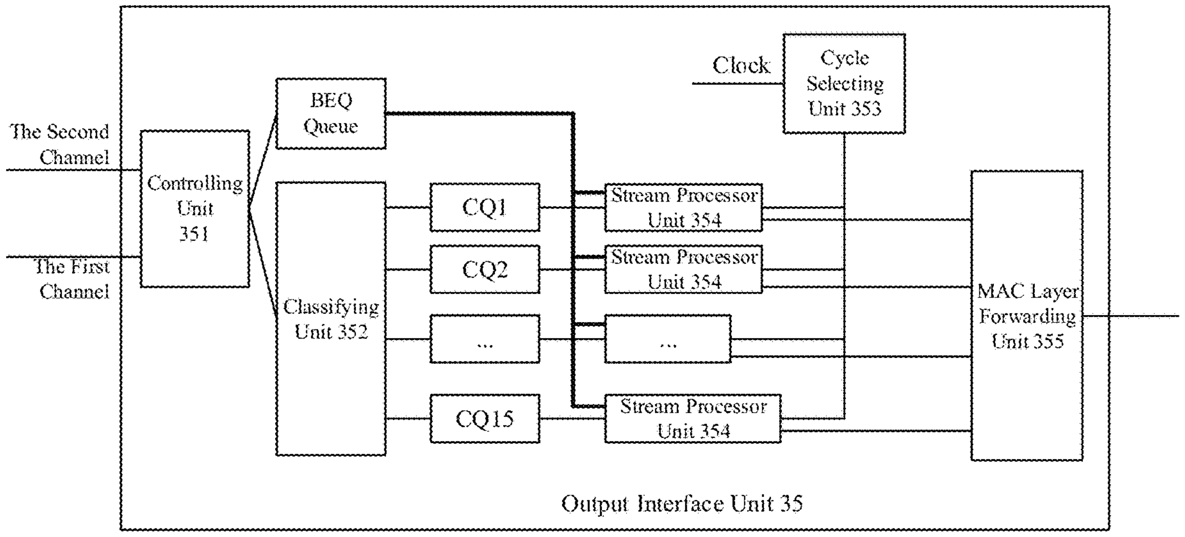
FIG. 5D is a structural schematic diagram illustrating an output interface unit according to an embodiment of the present disclosure.

FIG. 5D is a structural schematic diagram of the output interface unit 35. The output interface unit 35 may include a controlling unit 351, a classifying unit 352, a select by cycle unit 353, a stream processor (SP) unit 354, and an MAC layer forwarding unit 355. Furthermore, the output interface unit 35 may further include a BEQ queue and a CQ queue, where there is at least one BEQ queue. In FIG. 5D, for example, there is one BEQ queue and at least three CQ queues. In FIG. 5D, 15 CQ queues are exemplified and denoted as CQ1, CQ2, . . . and CQ15 respectively. When there are 15 CQ queues, there are also 15 SP units 354, where the SP units 354 are in one-to-one correspondence with the CQ queues.

When obtaining a packet from the first channel, i.e., the packet in the deterministic flow output queue 348, the controlling unit 351 may determine the packet belongs to the deterministic flow and send the packet to the classifying unit 352. When obtaining a packet from the second channel, i.e., the packet in the best-effort flow output queue 349, the controlling unit 351 may determine the packet belongs to the best-effort flow and store the packet into the BEQ queue.

The BEQ queue is a best-effort queue used to cache packets of the best-effort flow, where these packets have been scheduled in the HQOS scheduling unit 347. In the BEQ queue, two levels of high and low water marks are designed. When the number of packets cached in the BEQ queue is higher than the set high water mark (i.e. the first preset threshold), the flow control signal for the second channel may be output. When the number of packets cached in the BEQ queue is lower than the set low water mark (i.e. the second preset threshold), the flow control signal for the second channel may be cancelled.

On this basis, when a flow control signal for the second channel is present, the sending DMA 340 will no longer send a packet through the second channel, that is, no longer send the packet in the best-effort flow output queue 349 to the output interface unit 35 and thus, the controlling unit 351 will not obtain the packet of the best-effort flow output queue 349. When a flow control signal for the second channel is cancelled, the sending DMA 340 continues sending a packet through the second channel, that is, sending the packet in the best-effort flow output queue 349 to the output interface unit 35, and thus the controlling unit 351 can obtain a packet of the best-effort flow output queue 349 and store the packet into the BEQ queue.

The classifying unit 352 is configured to classify packets in the deterministic flow so as to store the packets into a CQ queue of CQ1 to CQ15. Since there are a total of 15 CQ queues, for example, CQ1 to CQ15, for a packet in the deterministic flow, the classifying unit 352 needs to determine which CQ queue the packet belongs to and store the packet into the CQ queue. For example, since CQ queue information is encapsulated in the packet and the CQ queue information may be a queue identifier or the like used to indicate a CQ queue, the classifying unit 352 may analyze out the CQ queue information from the packet, determine a CQ queue corresponding to the CQ queue information and store the packet into the CQ queue. If the CQ queue information corresponds to the CQ5, the packet is stored into the CQ5.

The select by cycle unit 353, under the control of a clock source, periodically gives a selection signal, where a length between two adjacent selection signals is one scheduling cycle of CSQF. For example, the scheduling cycle 1 corresponds to the CQ1 and the scheduling cycle 2 corresponds to the CQ2, and so on, and the scheduling cycle 15 corresponds to the CQ15.

On this basis, when the current scheduling cycle is the scheduling cycle 1, at the start of the scheduling cycle 1, the select by cycle unit 353 sends a selection signal to the SP unit 354 connected with the CQ1. After receiving the selection signal, the SP unit 354 determines the target CQ queue corresponding to the current scheduling cycle is the CQ1, reads a packet from the CQ1 and sends the read packet to the MAC layer forwarding unit 355. At the end of the scheduling cycle 1, the select by cycle unit 353 sends a new selection signal to the SP unit 354 connected with the CQ1. After receiving the selection signal, the SP unit 354 may stop sending packets.

When the current scheduling cycle is the scheduling cycle 2, at the start of the scheduling cycle 2 (the start of the scheduling cycle 2 is the end of the scheduling cycle 1), the select by cycle unit 353 sends a selection signal to the SP unit 354 connected with the CQ2. After receiving the selection signal, the SP unit 354 determines the target CQ queue corresponding to the current scheduling cycle is the CQ2, reads a packet from the CQ2 and sends the read packet to the MAC layer forwarding unit 355. At the end of the scheduling cycle 2, the select by cycle unit 353 sends a new selection signal to the SP unit 354 connected with the CQ2 to enable the SP unit 354 to stop sending packets.

By analogy, in each scheduling cycle, the select by cycle unit 353 may send a selection signal to a SP unit 354 such that the SP unit 354 sends a packet or stops sending a packet based on the selection signal.

The SP unit 354 is configured to, under the control of selection signal, perform packet forwarding based on priority, that is, firstly send the packets in the target CQ queue. After sending the packets in the target CQ queue, if the current scheduling cycle still has a remaining time slice, the SP unit 354 may be further configured to send a packet in the BEQ queue within the remaining time slice.

For example, it is assumed that the current scheduling cycle is a scheduling cycle n and the scheduling cycle n corresponds to a CQn ($1 \le n \le 15$). For the SP unit 354 connected with the CQn, the SP unit 354, after receiving a selection signal, determines the target CQ queue is the CQn, reads a packet from the CQn and sends the read packet to the MAC layer forwarding unit 355. After receiving the selection signal, the SP unit 354 may also perform timing with a timer.

After the packets in the CQn are sent, if the current scheduling cycle still has a remaining time slice, a length of the remaining time slice is determined, where the length of the remaining time slice is a difference between a time length of the scheduling cycle and a timing length of the timer. After the length of the remaining time slice is obtained, a length of packets which may be sent within the remaining time slice is determined.

Based on a packet length of one packet in the BEQ queue, one configured length may be pre-configured, for example, to 9600 bytes, where the 9600 bytes indicate a specified length of a packet. On this basis, if the length of packets which may be sent within the remaining time slice is greater than the configured length, within the remaining time slice of the current scheduling cycle, the SP unit 354 reads a packet from the BEQ queue and sends the read packet to the MAC layer forwarding unit 355. If the length of packets which may be sent within the remaining time slice is not greater than the configured length, within the remaining time slice of the current scheduling cycle, the SP unit 354 no longer sends a packet in the BEQ queue.

After the SP unit 354 reads one packet from the BEQ queue and sends the read packet to the MAC layer forwarding unit 355, if the length of packets which may be sent within the remaining time slice of the current scheduling cycle is still greater than the configured length, within the remaining time slice of the current scheduling cycle, the SP unit 354 continues reading one packet from the BEQ queue and sends the read packet to the MAC layer forwarding unit 355 and so on.

If the scheduling cycle 1 corresponds to the CQ1, a packet is obtained from the CQ1 and then sent in the scheduling cycle 1. When the sending of all packets in the CQ1 is completed, a remaining time slice is calculated based on the time length of the scheduling cycle and the value of the timer. If one packet of a set length (e.g. 9600 bytes) can be sent within the remaining time slice, one packet is obtained from the BEQ queue and then sent, otherwise, no packet is sent in the scheduling cycle 1 and a next scheduling cycle, i.e. the scheduling cycle 2 is waited for. If the scheduling cycle 2 corresponds to the CQ2, a packet is obtained from the CQ2 and sent in the scheduling cycle 2. When sending of all packets in the CQ2 is completed, a remaining time slice is calculated based on the time length of the scheduling cycle and the value of the timer. If one packet of a set length can be sent within the remaining time slice, one packet is obtained from the BEQ queue and then sent, otherwise, no packet is sent in the scheduling cycle 2 and a next scheduling cycle is waited for, and so on.

Illustratively, if the packets in the CQn are being sent currently and the remaining time slice of the current scheduling cycle is not sufficient to send all of the packets in the CQn, after the current scheduling cycle ends, sending of the packets in the CQn can be continued until sending of all packets in the CQn completed. Then, the packets in a next CQ are sent.

Illustratively, for each SP unit 354, the SP scheduling may be implemented in a simplified manner rather than by frame preemption scheduling manner. Of course, the SP scheduling may also be implemented in the frame preemption scheduling manner, which is not repeated herein.

The MAC layer forwarding unit 355 is configured to, after receiving a packet, send the packet to the external device. For example, when receiving a packet from a CQ queue, the MAC layer forwarding unit 355 sends the packet in the CQ queue to the external device; when receiving a packet from a BEQ queue, the MAC layer forwarding unit 355 sends the packet in the BEQ queue to the external device.

As can be seen from the above technical solutions, in the embodiments of the present disclosure, it can be guaranteed that the forwarding of the deterministic flow is not affected by the forwarding of the best-effort flow, and the forwarding of the deterministic flow and the forwarding of the best-effort flow are mutually compatible. Based on CSQF, packet transmission of wide area deterministic network and coexistence of the deterministic flow and the best-effort flow can be implemented to facilitate full integration of full services of common networks and common paths. When the deterministic flow reserved bandwidth is not used by the deterministic flow, it can be used by the best-effort flow, and the deterministic flow will not be affected in a case of occurrence of congestion. Thus, the congestion situations can be solved by controlling the number of best-effort flows. Hierarchical Quality of Service (HQOS) scheduling for the best-effort flow is maintained but the HQOS scheduling is not performed for the deterministic flow. In this way, it can be restricted that the deterministic flow is carried over the SR or SRv6 and the deterministic flow can be IP data flow. The deterministic flow is identified as quickly as possible at the front-most end of the reception side of the network device and independent data pipe or passage is established in the network device to ensure the deterministic flow is not impacted by the best-effort flow.

Figure 6:
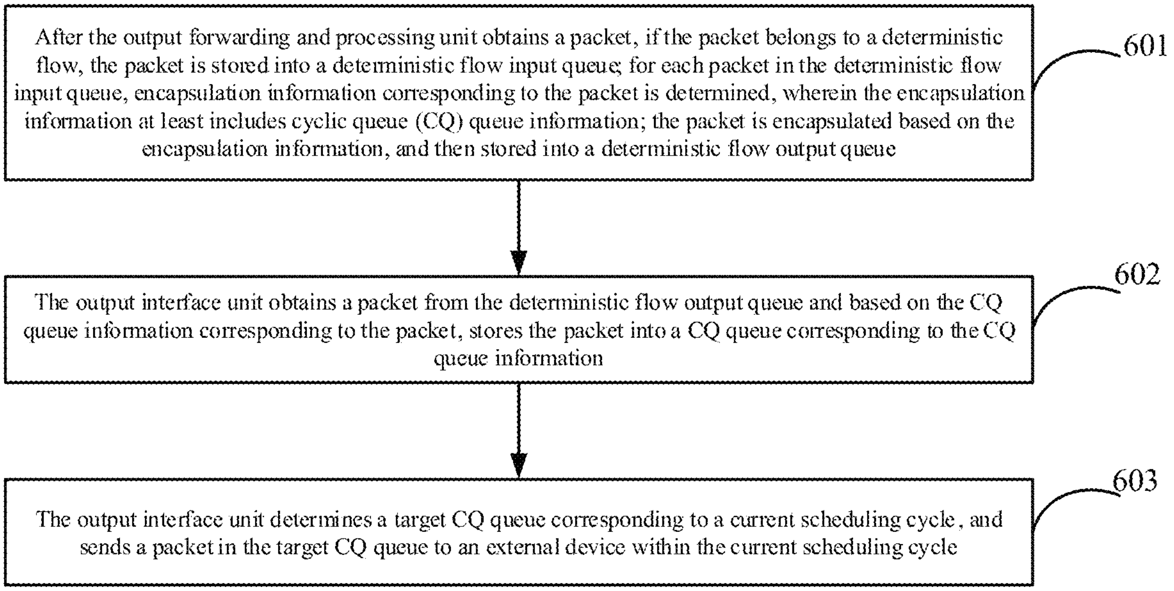
FIG. 6 is a schematic flowchart illustrating a packet transmission method according to an embodiment of the present disclosure.

An embodiment of the present disclosure provides a packet transmission method, which is applied to a network device. The network device may include an output forwarding and processing unit and an output interface unit. FIG. 6 is a flowchart of a packet transmission method according to an embodiment of the present disclosure. The method includes the following steps.

At step 601, after the output forwarding and processing unit obtains a packet, if the packet belongs to a deterministic flow, the packet is stored into a deterministic flow input queue; for each packet in the deterministic flow input queue, encapsulation information corresponding to the packet is determined, wherein the encapsulation information at least includes cyclic queue (CQ) queue information; the packet is encapsulated based on the encapsulation information, and then stored into a deterministic flow output queue.

At step 602, the output interface unit obtains a packet from the deterministic flow output queue and based on the CQ queue information corresponding to the packet, stores the packet into a CQ queue corresponding to the CQ queue information.

At step 603, the output interface unit determines a target CQ queue corresponding to a current scheduling cycle, and sends a packet in the target CQ queue to an external device within the current scheduling cycle.

In a possible implementation, after the output forwarding and processing unit obtains a packet, if the packet belongs to a best-effort flow, the packet is stored into a best-effort flow input queue; for each packet in the best-effort flow input queue, hierarchical quality of service (HQOS) scheduling is performed for the packet and then the HQOS scheduled packet is stored into a best-effort flow output queue; the output interface unit obtains a packet from the best-effort flow output queue and stores the packet into a best-effort queue (BEQ). On this basis, after the output interface unit sends packets in the target CQ queue to the external device within the current scheduling cycle, if the sending of the packets in the target CQ queue is finished and the current scheduling cycle still has a remaining time slice, the output interface unit sends a packet in the BEQ queue to the external device within the remaining time slice of the current scheduling cycle.

In a possible implementation, the network device further includes an input forwarding and processing unit. After the input forwarding and processing unit obtains a packet, if the packet belongs to the deterministic flow, the packet is stored into the deterministic flow input queue; if the packet belongs to the best-effort flow, the packet is stored into the best-effort flow input queue; wherein a queue priority corresponding to the deterministic flow input queue is higher than a queue priority corresponding to the best-effort flow input queue, such that the input forwarding and processing unit preferentially processes the packet in the deterministic flow input queue. When the input forwarding and processing unit processes a packet in the deterministic flow input queue, if the packet includes CQ queue indication information, a CQ queue corresponding to the CQ queue indication information is determined, otherwise, a CQ queue corresponding to the packet is determined based on a timestamp corresponding to the packet, wherein the timestamp refers to a timestamp that the network device receives the packet. The input forwarding and processing unit adds CQ queue information corresponding to the CQ queue to the packet and sends the packet to the output forwarding and processing unit such that the output forwarding and processing unit obtains the packet.

Illustratively, the network device further includes an internal exchange unit. When the input forwarding and processing unit sends a packet in the deterministic flow input queue to the output forwarding and processing unit, the input forwarding and processing unit adds a high priority mark to the packet, and sends the packet to the internal exchange unit, such that the internal exchange unit sends the packet to the output forwarding and processing unit based on the high priority mark. When the input forwarding and processing unit sends a packet in the best-effort flow input queue to the output forwarding and processing unit, the input forwarding and processing unit adds a low priority mark to the packet, and sends the packet to the internal exchange unit, such that the internal exchange unit sends the packet to the output forwarding and processing unit based on the low priority mark.

In a possible implementation, the network device further includes an input interface unit. After the input interface unit receives a packet from the external device, the input interface unit determines whether the packet belongs to the deterministic flow or the best-effort flow; if the packet belongs to the deterministic flow, the input interface unit stores the packet into the deterministic flow output queue, and if the packet belongs to the best-effort flow, the input interface unit stores the packet into the best-effort flow output queue. The input interface unit sends a packet in the deterministic flow output queue to the input forwarding and processing unit through a third channel, such that the input forwarding and processing unit obtains the packet from the third channel; wherein the input forwarding and processing unit determines the packet obtained from the third channel belongs to the deterministic flow. The input interface unit sends a packet in the best-effort flow output queue to the input forwarding and processing unit through a fourth channel, such that the input forwarding and processing unit obtains the packet from the fourth channel; wherein the input forwarding and processing unit determines the packet obtained from the fourth channel belongs to the best-effort flow.

An embodiment of the present disclosure provides a network device, including an output forwarding and processing unit and an output interface unit. The output forwarding and processing unit is configured to, after obtaining a packet, if the packet belongs to a deterministic flow, store the packet into a deterministic flow input queue; for each packet in the deterministic flow input queue, determine encapsulation information corresponding to the packet, wherein the encapsulation information at least includes cyclic queue (CQ) queue information; and perform encapsulation for the packet based on the encapsulation information and store the encapsulated packet into a deterministic flow output queue. The output interface unit is configured to obtain a packet from the deterministic flow output queue, and based on the CQ queue information corresponding to the packet, store the packet into a CQ queue corresponding to the CQ queue information. The output interface unit is configured to determine a target CQ queue corresponding to a current scheduling cycle and send a packet in the target CQ queue to an external device within the current scheduling cycle.

In a possible implementation, the output forwarding and processing unit is further configured to: after obtaining a packet, if the packet belongs to a best-effort flow, store the packet into a best-effort flow input queue; for each packet in the best-effort flow input queue, perform hierarchical quality of service (HQOS) scheduling for the packet and store the HQOS scheduled packet into a best-effort flow output queue; the output interface unit is further configured to obtain the packet from the best-effort flow output queue and store the packet into a best-effort queue (BEQ). After the output interface unit sends packets in the target CQ queue to the external device within the current scheduling cycle, the output interface unit is further configured to: if sending of the packets in the target CQ queue is finished and the current scheduling cycle still has a remaining time slice, send a packet in the BEQ queue to the external device within the remaining time slice of the current scheduling cycle.

Illustratively, the network device further includes an input forwarding and processing unit. The input forwarding and processing unit is configured to, after obtaining a packet, if the packet belongs to the deterministic flow, store the packet into the deterministic flow input queue; if the packet belongs to the best-effort flow, store the packet into the best-effort flow input queue; wherein a queue priority corresponding to the deterministic flow input queue is higher than a queue priority corresponding to the best-effort flow input queue, such that the input forwarding and processing unit preferentially processes the packet in the deterministic flow input queue. The input forwarding and processing unit is configured to, when processing the packet in the deterministic flow input queue, if the packet includes CQ queue indication information, determine a CQ queue corresponding to the CQ queue indication information, otherwise, determine a CQ queue corresponding to the packet based on a timestamp corresponding to the packet, wherein the timestamp refers to a timestamp that the network device receives the packet. The input forwarding and processing unit is further configured to add CQ queue information corresponding to the CQ queue to the packet and send the packet to the output forwarding and processing unit such that the output forwarding and processing unit obtains the packet.

Illustratively, the network device further includes an input interface unit. The input interface unit is configured to, after receiving a packet from the external device, determine whether the packet belongs to the deterministic flow or the best-effort flow; if the packet belongs to the deterministic flow, store the packet into the deterministic flow output queue, and if the packet belongs to the best-effort flow, store the packet into the best-effort flow output queue. The input interface unit is configured to, send a packet in the deterministic flow output queue to the input forwarding and processing unit through a third channel, such that the input forwarding and processing unit obtains the packet from the third channel; wherein the input forwarding and processing unit determines the packet obtained from the third channel belongs to the deterministic flow. The input interface unit is configured to send a packet in the best-effort flow output queue to the input forwarding and processing unit through a fourth channel, such that the input forwarding and processing unit obtains the packet from the fourth channel; wherein the input forwarding and processing unit determines the packet obtained from the fourth channel belongs to the best-effort flow.

The systems, apparatuses, modules or units described in the above examples may be specifically implemented by a computer chip or an entity or may be implemented by a product with a particular function. A typical implementing device may be a computer and the computer may be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

For convenience of description, the above apparatuses are divided into different units based on functionality for descriptions. Of course, the functions of different units may be implemented in a same or a plurality of hardware and/or software when practicing the present disclosure.

The persons skilled in the art should understand that the examples of the present disclosure may be provided as a method, a system, or a computer program product. Thus, entire hardware examples, entire software examples or examples combining software and hardware may be adopted in the present disclosure. Further, the present disclosure may be implemented in the form of a computer program product that is operated on one or more computer available storage media (including but not limited to magnetic disk memory, CD-ROM, and optical memory and so on) including computer available program codes.

The present disclosure is described by referring to flowcharts and/or block diagrams of a method, a device (a system) and a computer program product in an example of the present disclosure. It is understood that each flow and/or block in the flowcharts and/or the block diagrams or a combination of a flow and/or a block of the flowcharts and/or the block diagrams may be implemented by computer program instructions. These computer program instructions may be provided to a general-purpose computer, a dedicated computer, an embedded processor, or a processor of another programmable data processing device to generate a machine so that the instructions executable by a computer or a processor of another programmable data processing device generate an apparatus for implementing functions designated in one or more flows of the flowcharts and/or one or more blocks of the block diagrams.

Further, these computer program instructions may also be stored in a computer readable memory that can direct a computer or another programmable data processing device to work in a particular manner so that the instructions stored in the computer readable memory generate a product including an instruction apparatus and the instruction apparatus can implement functions designated in one or more flows of the flowcharts and/or one or more blocks of the block diagrams.

The computer program instructions may also be loaded on a computer or another programmable data processing device, so that a series of operation steps can be executed on the computer or another programmable device to generate processing achieved by the computer, and thus instructions executable on the computer or another programmable device are provided for steps for realizing functions designated in one or more flows of the flowcharts and/or one or more blocks of the block diagrams.

The above descriptions are only some examples of the present disclosure, and are not used to limit the present disclosure. For those skilled in the art, the present disclosure may have various changes and modifications. Any modifications, equivalent replacements, improvements, etc. made within the spirit and principle of this present disclosure shall fall within the scope of claims of the present disclosure.

The invention claimed is:

1. A packet transmission method, being applied to a network device, wherein the network device at least comprises an output forwarding and processing unit and an output interface unit, and the method comprises:

after the output forwarding and processing unit obtains a packet, if the packet belongs to a deterministic flow, storing, by the output forwarding and processing unit, the packet into a deterministic flow input queue; for each packet in the deterministic flow input queue, determining encapsulation information corresponding to the packet, wherein the encapsulation information at least comprises cyclic queue (CQ) queue information; encapsulating the packet based on the encapsulation information, and storing the encapsulated packet into a deterministic flow output queue;

obtaining, by the output interface unit, a packet from the deterministic flow output queue and based on the CQ queue information corresponding to the packet, storing the packet into a CQ queue corresponding to the CQ queue information;

determining, by the output interface unit, a target CQ queue corresponding to a current scheduling cycle, and sending a packet in the target CQ queue to an external device within the current scheduling cycle;

after the output forwarding and processing unit obtains a packet, if the packet belongs to a best-effort flow, storing, by the output forwarding and processing unit, the packet into a best-effort flow input queue; for each packet in the best-effort flow input queue, performing hierarchical quality of service (HQOS) scheduling for the packet and storing the HQOS scheduled packet into a best-effort flow output queue; obtaining, by the output interface unit, a packet from the best-effort flow output queue and storing the packet into a best-effort queue BEQ) queue;

after the output interface unit sends a packet in the target CQ queue to the external device within the current scheduling cycle, the method further comprises: if sending of the packets in the target CQ queue is finished and the current scheduling cycle still has a remaining time slice, sending, by the output interface unit, a packet in the BEQ queue to the external device within the remaining time slice of the current scheduling cycle.

2. The method of claim 1, wherein, there is a first channel and a second channel between the output interface unit and the output forwarding and processing unit;

obtaining, by the output interface unit, the packet from the deterministic flow output queue comprises: obtaining, by the output interface unit, a packet from the deterministic flow output queue through the first channel;

obtaining, by the output interface unit, the packet from the best-effort flow output queue comprises: obtaining, by the output interface unit, a packet from the best-effort flow output queue through the second channel;

wherein when a number of packets in the BEQ queue is greater than a first preset threshold, the output interface unit outputs a flow control signal for the second channel; when a number of packets in the BEQ queue is less than a second preset threshold, the output interface unit cancels the flow control signal for the second channel; when there is a flow control signal for the second channel, a packet transmission through the second channel is paused;

wherein the second preset threshold is less than or equal to the first preset threshold.

3. The method of claim 1, wherein sending, by the output interface unit, the packet in the BEQ queue to the external device within the remaining time slice of the current scheduling cycle comprises:

determining, by the output interface unit, a size of a packet enabled to be sent within the remaining time slice, and if the size of the packet is greater than a configured length, sending one packet in the BEQ queue to the external device within the remaining time slice of the current scheduling cycle; if the size of the packet is not greater than the configured length, stopping sending the packet in the BEQ queue to the external device within the remaining time slice of the current scheduling cycle;

after sending the one packet in the BEQ queue to the external device, updating the remaining time slice of the current scheduling cycle and returning to determine the size of a packet enabled to be sent within the updated remaining time slice.

4. The method of claim 1, wherein, the network device further comprises an input forwarding and processing unit and the method further comprises:

after the input forwarding and processing unit obtains a packet, if the packet belongs to the deterministic flow, storing, by the input forwarding and processing unit, the packet into the deterministic flow input queue; or, if the packet belongs to the best-effort flow, storing the packet into the best-effort flow input queue; wherein a queue priority corresponding to the deterministic flow input queue is higher than a queue priority corresponding to the best-effort flow input queue, such that the input forwarding and processing unit preferentially processes the packet in the deterministic flow input queue;

when the input forwarding and processing unit processes a packet in the deterministic flow input queue, if the packet comprises CQ queue indication information, determining, by the input forwarding and processing unit, a CQ queue corresponding to the CQ queue indication information, otherwise, determining a CQ queue corresponding to the packet based on a timestamp corresponding to the packet, wherein the timestamp refers to a timestamp that the network device receives the packet; adding CQ queue information corresponding to the CQ queue to the packet and sending the packet to the output forwarding and processing unit such that the output forwarding and processing unit obtains the packet.

5. The method of claim 4, wherein determining, by the input forwarding and processing unit, the CQ queue corresponding to the packet based on the timestamp corresponding to the packet comprises:

querying for, by the input forwarding and processing unit, an egress interface based on forwarding information corresponding to the packet, and determining a plurality of CQ queues corresponding to the egress interface, wherein each of the CQ queues has a corresponding scheduling cycle;

based on the timestamp corresponding to the packet, selecting, by the input forwarding and processing unit, a scheduling cycle corresponding to the timestamp from all scheduling cycles, and determining a CQ queue corresponding to the scheduling cycle.

6. The method of claim 4, wherein, the network device further comprises an internal exchange unit, and the method further comprises:

when the input forwarding and processing unit sends a packet in the deterministic flow input queue to the output forwarding and processing unit, adding a high priority mark to the packet, and sending the packet to the internal exchange unit, such that the internal exchange unit sends the packet to the output forwarding and processing unit based on the high priority mark;

when the input forwarding and processing unit sends a packet in the best-effort flow input queue to the output forwarding and processing unit, adding a low priority mark to the packet, and sending the packet to the internal exchange unit, such that the internal exchange unit sends the packet to the output forwarding and processing unit based on the low priority mark.

7. The method of claim 4, wherein, the network device further comprises an input interface unit, and the method further comprises:

after the input interface unit receives a packet from the external device, determining whether the packet belongs to the deterministic flow or the best-effort flow; if the packet belongs to the deterministic flow, storing the packet into the deterministic flow output queue, and if the packet belongs to the best-effort flow, storing the packet into the best-effort flow output queue;

sending, by the input interface unit, a packet in the deterministic flow output queue to the input forwarding and processing unit through a third channel, such that the input forwarding and processing unit obtains the packet from the third channel; wherein the input forwarding and processing unit determines the packet obtained from the third channel belongs to the deterministic flow;

sending, by the input interface unit, a packet in the best-effort flow output queue to the input forwarding and processing unit through a fourth channel, such that the input forwarding and processing unit obtains the packet from the fourth channel; wherein the input forwarding and processing unit determines the packet obtained from the fourth channel belongs to the best-effort flow.

8. The method of claim 7, wherein, determining, by the input interface unit, whether the packet belongs to the deterministic flow or the best-effort flow comprises:

analyzing out, by the input interface unit, a flow feature from the packet; if the flow feature is matched with a deterministic flow feature in a configured access control list (ACL), determining the packet belongs to the deterministic flow; if the flow feature is not matched with the deterministic flow feature in the ACL, determining the packet belongs to the best-effort flow;

wherein the ACL comprises at least one deterministic flow feature.

9. The method of claim 7, wherein sending, by the input interface unit, the packet in the deterministic flow output queue to the input forwarding and processing unit through the third channel and sending the packet in the best-effort flow output queue to the input forwarding and processing unit through the fourth channel comprise:

preferentially obtaining, by the input interface unit, a packet from the deterministic flow output queue, and sending the obtained packet to the input forwarding and processing unit through the third channel;

after all packets in the deterministic flow output queue are obtained, obtaining a packet from the best-effort flow output queue and sending the obtained packet to the input forwarding and processing unit through the fourth channel.

10. A network device, comprising an output forwarding and processing unit and an output interface unit; wherein, the output forwarding and processing unit is configured to, after obtaining a packet, if the packet belongs to a deterministic flow, store the packet into a deterministic flow input queue; for each packet in the deterministic flow input queue, determine encapsulation information corresponding to the packet, wherein the encapsulation information at least comprises cyclic queue (CQ) queue information; and perform encapsulation for the packet based on the encapsulation information and store the encapsulated packet into a deterministic flow output queue;

the output interface unit is configured to obtain a packet from the deterministic flow output queue, and based on the CQ queue information corresponding to the packet, store the packet into a CQ queue corresponding to the CQ queue information;

the output interface unit is configured to determine a target CQ queue corresponding to a current scheduling cycle and send a packet in the target CQ queue to an external device within the current scheduling cycle;

the output forwarding and processing unit is further configured to: after obtaining a packet, if the packet belongs to a best-effort flow, store the packet into a best-effort flow input queue; for each packet in the best-effort flow input queue, perform hierarchical quality of service (HQOS) scheduling for the packet and store the HQOS scheduled packet into a best-effort flow output queue; the output interface unit is further configured to obtain the packet from the best-effort flow output queue and store the packet into a best-effort queue (BEQ) queue;

after the output interface unit sends a packet in the target CQ queue to the external device within the current scheduling cycle, the output interface unit is further configured to: if sending of the packet in the target CQ queue is finished and the current scheduling cycle still has a remaining time slice, send a packet in the BEQ queue to the external device within the remaining time slice of the current scheduling cycle.

11. The network device of claim 10, wherein, the network device further comprises an input forwarding and processing unit; wherein, the input forwarding and processing unit is configured to, after obtaining a packet, if the packet belongs to the deterministic flow, store the packet into the deterministic flow input queue; or, if the packet belongs to the best-effort flow, store the packet into the best-effort flow input queue; wherein a queue priority corresponding to the deterministic flow input queue is higher than a queue priority corresponding to the best-effort flow input queue, such that the input forwarding and processing unit preferentially processes the packet in the deterministic flow input queue;

the input forwarding and processing unit is configured to, when processing the packet in the deterministic flow input queue, if the packet comprises CQ queue indication information, determine a CQ queue corresponding to the CQ queue indication information, otherwise, determine a CQ queue corresponding to the packet based on a timestamp corresponding to the packet, wherein the timestamp refers to a timestamp that the network device receives the packet;

the input forwarding and processing unit is also configured to add CQ queue information corresponding to the CQ queue to the packet and send the packet to the output forwarding and processing unit such that the output forwarding and processing unit obtains the packet.

12. The network device of claim 11, wherein when determining the CQ queue corresponding to the packet based on the timestamp corresponding to the packet, the input forwarding and processing unit is specifically configured to: query for an egress interface based on forwarding information corresponding to the packet, and determine a plurality of CQ queues corresponding to the egress interface, wherein each of the CQ queues has a corresponding scheduling cycle; based on the timestamp corresponding to the packet, select a scheduling cycle corresponding to the timestamp from all scheduling cycles, and determine a CQ queue corresponding to the scheduling cycle.

13. The network device of claim 11, wherein, the network device further comprises an input interface unit; wherein, the input interface unit is configured to, after receiving a packet from the external device, determine whether the packet belongs to the deterministic flow or the best-effort flow; if the packet belongs to the deterministic flow, store the packet into the deterministic flow output queue, and if the packet belongs to the best-effort flow, store the packet into the best-effort flow output queue;

the input interface unit is configured to, send a packet in the deterministic flow output queue to the input forwarding and processing unit through a third channel, such that the input forwarding and processing unit obtains the packet from the third channel; wherein the input forwarding and processing unit determines the packet obtained from the third channel belongs to the deterministic flow;

the input interface unit is configured to send a packet in the best-effort flow output queue to the input forwarding and processing unit through a fourth channel, such that the input forwarding and processing unit obtains the packet from the fourth channel; wherein the input forwarding processing unit determines the packet obtained from the fourth channel belongs to the best-effort flow.

* * * * *